United States Patent
Higashi et al.

[11] Patent Number: 6,160,367
[45] Date of Patent: Dec. 12, 2000

[54] APPARATUS AND METHOD FOR DRIVING MOTOR

[75] Inventors: Mitsuhide Higashi, Kusatsu; Kiyoshi Sano, Ohtsu; Masanori Ogawa, Kusatsu, all of Japan

[73] Assignee: Matsushita Electric Industrial Co., Ltd., Osaka, Japan

[21] Appl. No.: 09/347,414

[22] Filed: Jul. 6, 1999

[30] Foreign Application Priority Data

Jul. 7, 1998 [JP] Japan ................................. 10-191429

[51] Int. Cl.[7] ................................. H02P 6/12; H02P 6/18
[52] U.S. Cl. ........................ 318/254; 318/439; 318/245; 318/138
[58] Field of Search ..................... 318/138, 245, 318/254, 439, 599, 616, 431, 603, 626

[56] References Cited

U.S. PATENT DOCUMENTS

| | | | |
|---|---|---|---|
| 5,572,097 | 11/1996 | Cameron | 318/254 |
| 5,627,441 | 5/1997 | Sakurai et al. | 318/599 |
| 5,637,972 | 6/1997 | Randall et al. | 318/616 |
| 5,717,298 | 2/1998 | Tang et al. | 318/254 |
| 5,744,921 | 4/1998 | Makaran | 318/254 |
| 5,859,512 | 1/1999 | Buthker | 318/254 |
| 6,051,943 | 4/2000 | Rabin et al. | 318/254 |

FOREIGN PATENT DOCUMENTS 9-285177  10/1997  Japan.
9-327194  12/1997  Japan.

*Primary Examiner*—Paul Ip
*Attorney, Agent, or Firm*—Wenderoth, Lind & Ponack, L.L.P.

[57] ABSTRACT

An apparatus and method for driving a motor with a reduced current flowing in the motor, as well as reduced vibrations of the motor at a start-up is provided. The motor driving apparatus has a position detector for detecting a position of a rotor of a brushless DC motor, a DC/AC converter for converting a DC voltage derived from a DC power supply into an AC voltage, and a controller for controlling the DC/AC converter to control the conduction of a stator winding of the motor. For a start-up of the motor, the controller positions the rotor by supplying a current to a first conduction phase of the stator winding, and then once turns off the conduction. After that, the controller controls the DC/AC converter to rotate the rotor by supplying current to a second conduction phase of the stator winding, and to start a position detecting operation after a specified time elapses since the rotor starts rotation.

8 Claims, 6 Drawing Sheets

| DRIVE SIGNAL PATTERN | CONDUCTION PHASE | | MAGNETIC FIELD |
|---|---|---|---|
| | UPPER ARM | LOWER ARM | |
| PTN1 | U | V | B1 |
| PTN2 | U | W | B2 |
| PTN3 | V | W | B3 |
| PTN4 | V | U | B4 |
| PTN5 | W | U | B5 |
| PTN6 | W | V | B6 |

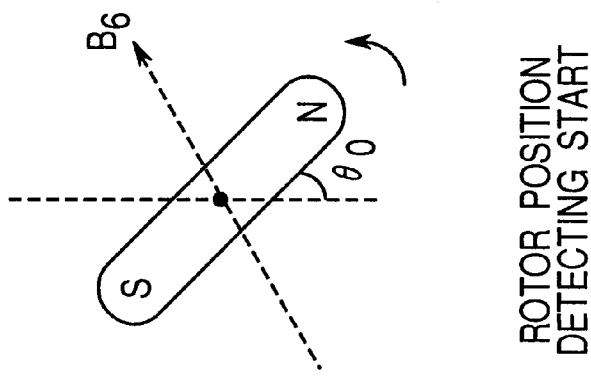
Fig.4D — ROTOR POSITION DETECTING START
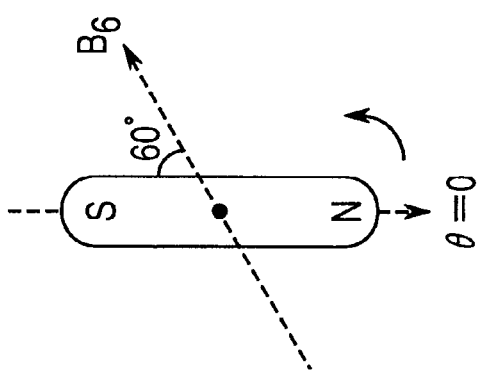
Fig.4C — ROTATION START
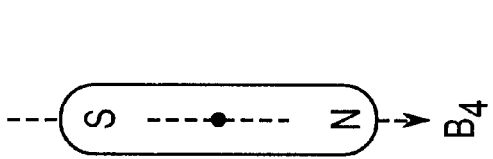
Fig.4B — POSITIONING
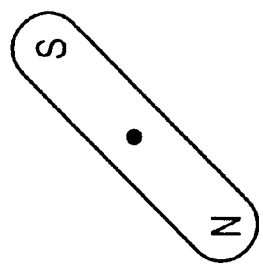
Fig.4A — BEFORE POSITIONING

PATTERN

INDUCED VOLTAGE ON U-PHASE

APPARATUS AND METHOD FOR DRIVING MOTOR

This application is based on an application No. H10-191429 filed in Japan, the disclosure of which is hereby incorporated by reference.

BACKGROUND OF THE INVENTION

1. Field of the Invention

The present invention relates to a device for and a method of driving an electric motor and, more particularly, to the device for and the method of driving the electric motor based on a detected position of the rotor.

2. Description of the Related Art

For driving a brushless DC motor including a three-phase stator winding comprising three coils each corresponding to a U-, V-, or W-phase, generally, the position of a rotor employed in the brushless DC motor is detected by an induced voltage generated in the coil in which current is not supplied (the phase of this coil is referred to below as the "non-conduction phase"). The brushless DC motor is driven by changing over the coils in which current is supplied to drive the motor (the phases of these coils are referred to below as the "conduction phase") based on the detected rotor position. However, immediately after the start-up, the rotor position cannot be effectively detected since the rotating speed of the brushless DC motor is so low at that time that the induced voltage generated in the stator winding of the non-conduction phase is insufficient. Therefore, a "synchronized operation" has been preformed at the time of start-up, in which the conduction phases are changed over at specified timing regardless of the rotor position of the brushless DC motor to drive the motor. Also, with the rotating speed of the brushless DC motor higher than a specific value, a "position detecting operation" is performed, in which the brushless DC motor is driven by changing over the conduction phases based on the rotor position.

However, the synchronized operation requires an overexcitation operation and, therefore, a problem has been experienced in that a large current flows in the brushless DC motor. Also in the synchronized operation, the current flowing in the brushless DC motor becomes unstable, causing another problem of increased vibrations of the brushless DC motor.

SUMMARY OF THE INVENTION

The present invention is directed to solve the above problems and is intended to provide an apparatus for and a method of driving a motor with a three-phase stator winding so as to reduce the current flowing in the motor as well as vibrations of the motor at the start-up.

In a first aspect of the invention, the apparatus comprises a DC/AC converter having switching devices, a position detector for detecting a position of a rotor of the motor, and a controller for controlling switching operation of the DC/AC converter to change over conduction phases of a stator winding of the motor. The DC/AC converter converts an output from a DC power supply into an alternating current by the switching operation of the switching devices, and outputs the alternating current to the motor.

At a start-up of the motor, the controller controls the switching operation so as to perform a position detecting operation. The position detecting operation comprises the steps of positioning the rotor to a specified position by supplying an electric current to a first conduction phase of the stator winding of the motor, starting rotation of the rotor by supplying a current to a second conduction phase of the stator winding, and changing over the conduction phase of the stator winding based on a rotor position detected by the position detector after a specified time elapses since the rotor started rotating.

In the apparatus, after the positioning, the controller may control the switching operation by once turning off the conduction of the stator winding and then may supply current to the second conduction phase of the stator winding so as to cause the rotor to rotate.

In the apparatus, the specified time may be time necessary for the rotor to rotate a predetermined angle, for example 30° since the start of rotation.

In the apparatus, the positioning of the rotor may be performed by supplying current to two different conduction phases of the stator winding.

In a second aspect, a method is provided for driving a motor by detecting a position of a rotor of the motor and changing over a conduction phase of a stator winding of the motor based on the detected rotor position. This method comprises before start-up of the motor, positioning the rotor to a specified position by supplying current to a first conduction phase of the stator winding, turning off the first conduction phase of the stator winding, rotating the rotor by supplying current to a second conduction phase of the stator winding, and d) detecting a position of the rotor after a specified time since the start of rotation of the rotor and changing over the conduction phase based on the detected rotor position.

According to the present invention, at the start-up of the brushless DC motor, the position detecting operation in which the conduction phase of the armature winding is changed over under the detection of the rotor position is performed without the synchronous operation being performed. Therefore, there is no need to perform the synchronous operation at the start-up of the motor, allowing motor current and vibrations at the start-up to be reduced.

BRIEF DESCRIPTION OF THE DRAWINGS

Other objects and attainments together with a fuller understanding of the invention will become apparent and appreciated by referring to the following description and claims taken in conjunction with the accompanying drawings, in which:

FIGS. 4A–4D are views explaining the behavior of a rotor of the brushless DC motor at a start-up;

DETAILED DESCRIPTION OF THE PREFERRED EMBODIMENTS

A motor driving apparatus according to a preferred embodiment of the present invention drives a brushless DC motor having a three-phase stator winding without synchronized operation. For this purpose, before start-up, the motor driving apparatus positions the rotor of the motor by supplying electric current to a first conduction phase of the stator winding of the motor, and then turns off the conduction. After that, the apparatus starts rotating the brushless DC motor by supplying electric current to a second conduction phase of the stator winding of the motor, and after a predetermined time, starts driving the motor based on position detection, that is, starts a position detecting operation. This operation is discussed in detail below.

Figure 1:
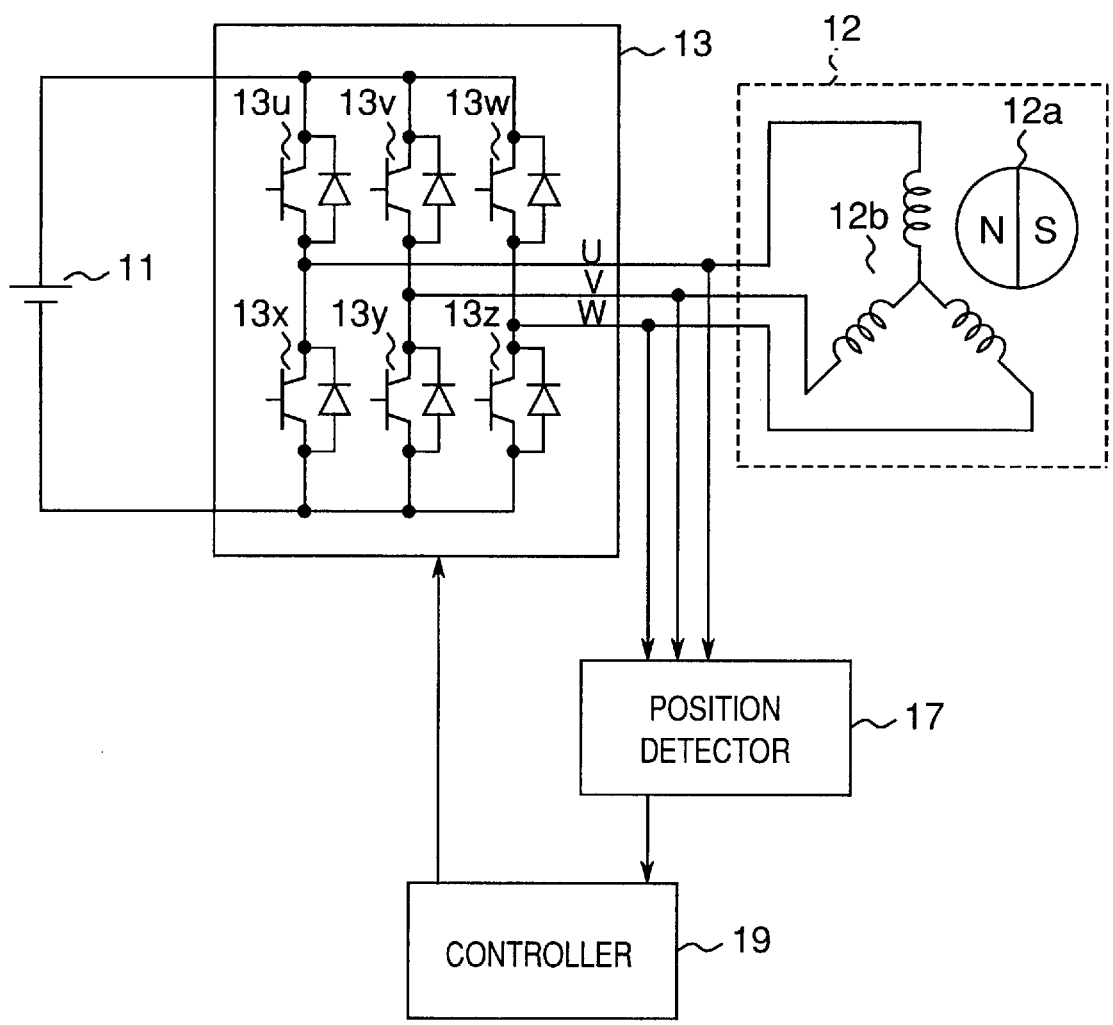
FIG. 1 is a block diagram of a motor driving apparatus according to the present invention.

FIG. 1 shows the motor driving apparatus of this embodiment. The motor driving apparatus comprises a DC/AC converter 13 for converting a DC voltage inputted from a DC power supply 11 into a three-phase AC voltage and outputting the resulting voltage to a brushless DC motor 12, including a three-phase stator winding 12b comprising three coils each corresponding to a U-, V-, or W-phase, a position detector 17 for detecting a position of a rotor 12a of the motor 12, and a controller 19 for controlling phases and frequency of an output voltage of the DC/AC converter 13.

The position detector 17 detects a zero-cross point of an induced voltage generated in al non-conduction phase of the stator winding 12b of the brushless DC motor 12, and outputs positional information about the rotor 12a to the controller 19 based on the detected zero-cross point.

The DC/AC converter 13 has six switching devices 13u–13w, 13x–13z which open and close at high speed. By switching operations of these switching devices 13u–13w, 13x–13z, a DC voltage from the DC power supply 11 is converted into a three-phase AC voltage and then fed to the brushless DC motor 12.

The controller 19 changes the magnitude of the AC voltage fed to the brushless DC motor 12 by controlling the switching operations of the switching devices 13u–13w, 13x–13z of the DC/AC converter 13. In this operation, the controller 19 controls the frequency of the brushless DC motor 12 by changing over the conduction phases of the stator winding 12b. This changeover is achieved by controlling the on/off operations of the switching devices 13u–13w, 13z–13x of the DC/AC converter 13 based on the positional information about the rotor 12a detected by the position detector 17.

The switching devices 13u–13w, 13z–13x of the DC/AC converter 13 are driven by a drive signal outputted from the controller 19. The drive signal has six patterns PTN1–PTN6, and these patterns are outputted sequentially. Accordingly, the conduction phase of the stator winding 12b is changed over in response to these patterns PTN1–PTN6.

Figures 2A, 2B:
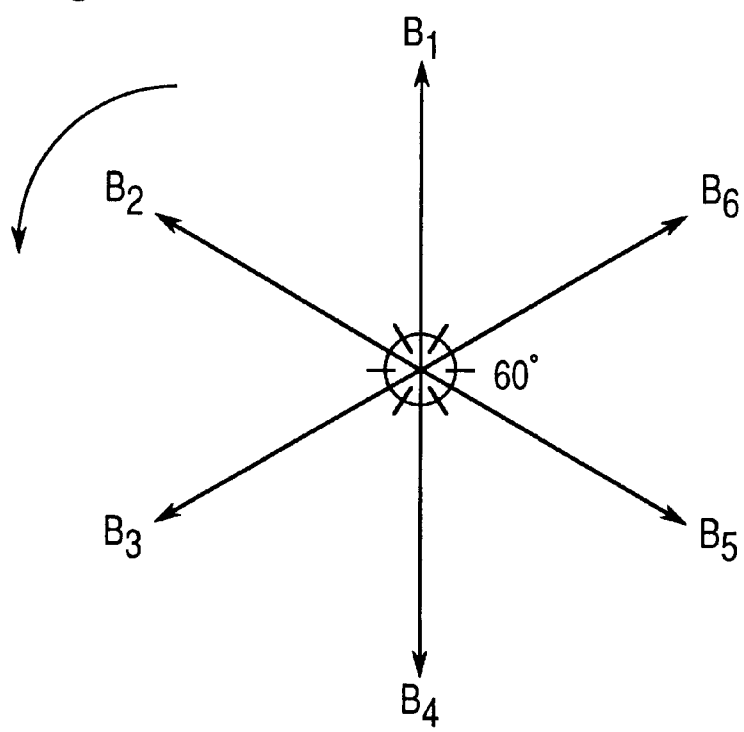
FIG. 2A is a table relating drive signal patterns to conduction phases.
FIG. 2B is a view explaining magnetic fields generated in the stator winding of a brushless DC motor.

FIG. 2A is a table showing the relationship among those drive signal patterns PTN1–PTN6, conduction phase of the stator winding 12b corresponding to those patterns PTN1–PTN6, and magnetic fields $B_1$–$B_6$ generated in the stator winding 12b. As shown in the figure with the pattern PTN1, the upper arm switching device 13u of U-phase and the lower arm switching device 13y of V-phase are turned on to supply current to coils corresponding to U-phase and V-phase. With the pattern PTN2, the upper arm switching device 13u of U-phase and the lower arm switching device 13z of W-phase are turned on. With the pattern PTN3, the upper arm switching device 13v of V-phase and the lower arm switching device 13z of W-phase are turned on. With the pattern PTN4, the upper arm switching device 13v of V-phase and the lower arm switching device 13x of U-phase are turned on. With the pattern PTN5, the upper arm switching device 13w of W-phase and the lower arm switching device 13x of U-phase are turned on. With the pattern PTN6, the upper arm switching device 13w of W-phase and the lower arm switching device 13y of V-phase are turned on.

FIG. 2B shows changes in magnetic fields $B_1$–$B_6$ which are generated when the switching devices 13u–13w, 13z–13x are driven with the above patterns PTN1–PTN6. As shown in the figure, the magnetic fields $B_1$–$B_6$ are generated one after another with the changeovers of the patterns PTN1–PTN6. In FIG. 2B, the direction of an arrow indicates the direction of a magnetic field.

The above patterns are changed over by the controller 19 based on the induced voltage of the non-conducting stator winding 12b obtained by the position detector 17. That is, at a zero-cross point of the induced voltage or a time point with predetermined delay from the zero-cross point, patterns are switched.

Figure 3:
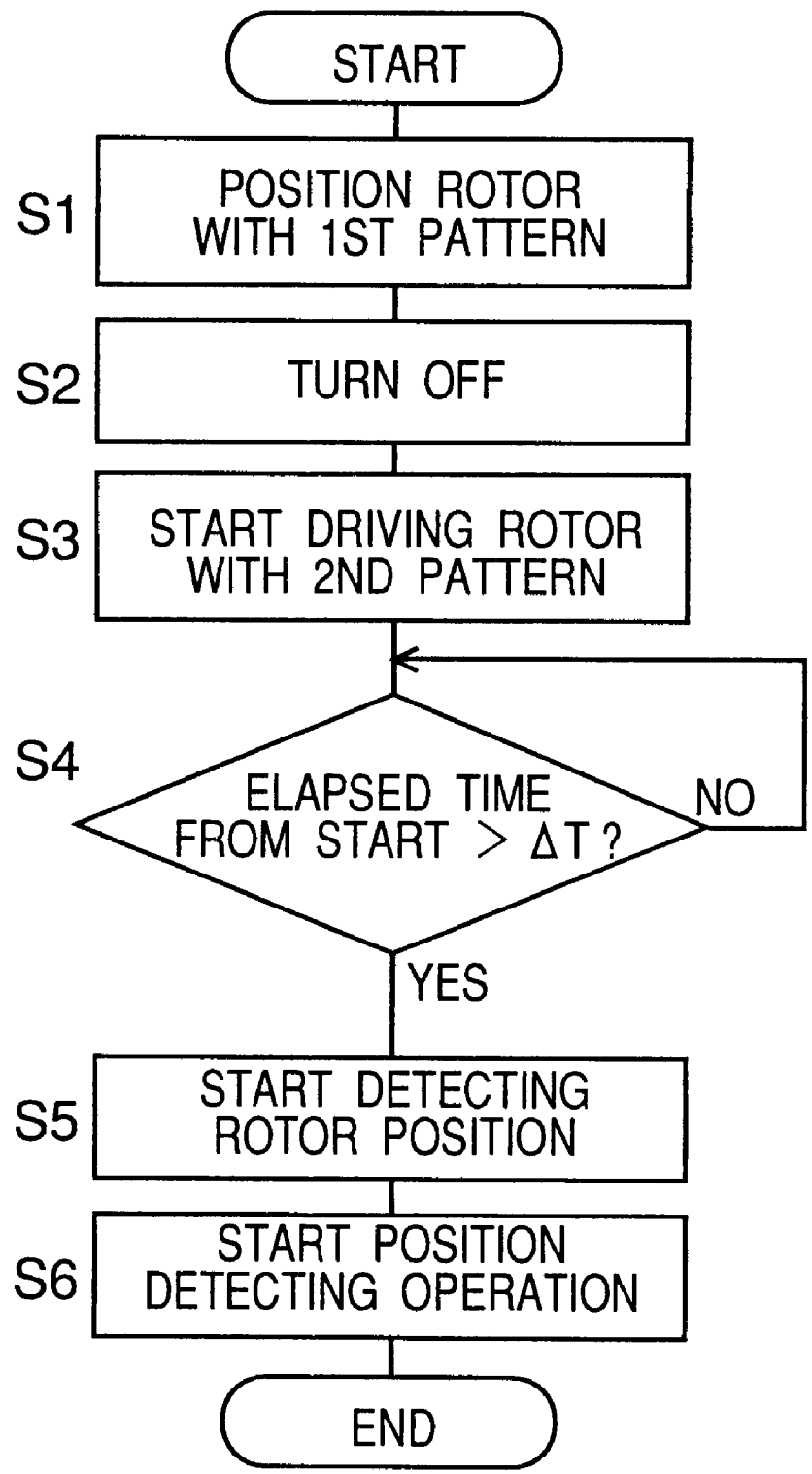
FIG. 3 is a flow chart of start-up control in the motor driving apparatus.

Control operation at a start-up by the controller 19 in the motor driving apparatus is described below with reference to the flow chart of FIG. 3.

For a start-up of the brushless DC motor 12, first, the rotor 12a is fixed, and thereby positioned, to a specified position by electrical conduction to the stator winding (coils) with a first specified pattern (S1). For example, when the rotor 12a is at a position shown in FIG. 4A before start-up, electrical conduction with the pattern PTN4 causes the magnetic field $B_4$ to be generated so that the rotor 12a is positioned to a position shown in FIG. 4B.

Otherwise, the positioning of the rotor 12a may also be implemented by using two patterns. For example, the positioning may be achieved by effecting electrical conduction with the pattern PTN3 and subsequently effecting electrical conduction with the pattern PTN4. In this connection, if the positioning is done with only one pattern, there are some cases where the rotor 12a is positioned to such a position (death point) that the start-up is disabled (for example, a case where the magnetic poles of the rotor in FIG. 4B are reversed). Therefore, effecting the positioning with two patterns can prevent the rotor from being positioned to the death-point position.

After the positioning, the conduction to the stator winding 12b with the first specified pattern is once turned off (S2). This is intended to prevent the possibility that both the upper arm switching device and the lower arm switching device are turned on simultaneously so as to cause a short-circuit when a conduction for positioning and another conduction for start-up of the rotor 12a as described later, are effected continuously.

Next, by electrical conduction to the stator winding with a second specified pattern different from the first specified pattern, the rotor 12a is started to rotate (S3). For example, the magnetic field $B_6$ is generated with the pattern PTN6 as shown in FIG. 4C, by which the rotor 12a is rotated. Like this, the second pattern for starting up the rotor 12a after the positioning may be preferably set to a second pattern, next to the first pattern that has been used for the positioning so that the rotation starting torque becomes maximum.

After that, it is decided whether or not a specified time ΔT or more has elapsed since the start of the rotation of the rotor 12a (S4). When the specified time ΔT has not yet elapsed since the rotation start, i.e. when the rotor 12a has not yet rotated to a specified angle $θ_0$, then the program flow returns to step S4. When the specified time ΔT has elapsed since the rotation start, i.e. when the rotor 12a has rotated to the specified angle $\theta_0$ or more, then the position detection for the rotor 12a is started (S5).

As described above, the controller 19 does not detect the position of the rotor 12a during the period of the specified time ΔT. This is intended to prevent any misdetection by suppressing the detection of the rotor position during the period of the specified time ΔT until a stable induced voltage is obtained, because the rotating speed is too low to provide enough induced voltage in early stages subsequent to the start of the rotation of the rotor 12a. This specified time ΔT is set to, for example, the time required from when the rotor 12a starts rotating until the rotor 12a rotates to the specified angle $\theta_0$. As an example, the time may be set to time required from when the rotor 12a starts until the rotor 12a rotates to a position where magnetic field and magnetic-pole direction of the rotor 12a cross perpendicularly to each other (where the zero-cross of induced voltage is detected), i.e., to an angle of 30°.

Figure 5A:
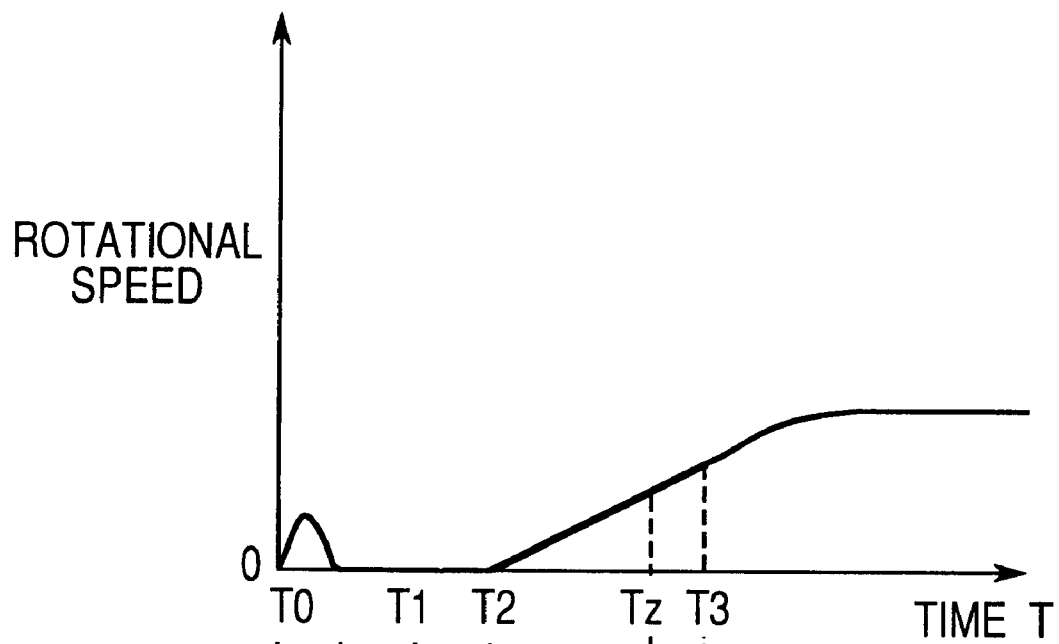
FIG. 5A is a chart showing change in the rotating speed of the rotor of the brushless DC motor at a start-up, with time dependency.
Figure 5B:
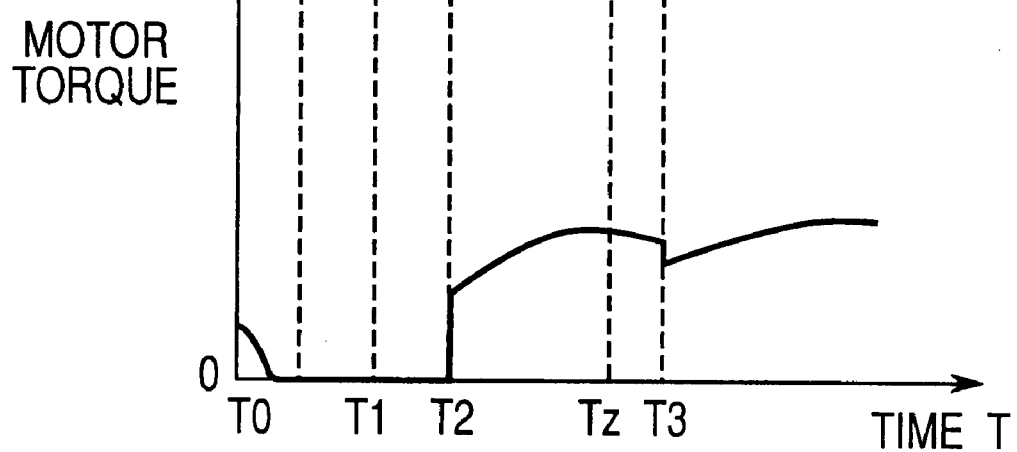
FIG. 5B is a chart showing change in torque generated in the brushless DC motor with time dependency.

After that, the position detecting operation is started (S6) (see FIG. 4D), in which the conduction phase (patterns PTN1–PTN6) is changed over according to the detected position of the rotor 12a. In such control operation for start-up, time dependency of the rotating speed of the brushless DC motor 12 as well as time dependency of the torque generated in the brushless DC motor are shown in FIGS. 5A and 5B, respectively.

Figure 6A:
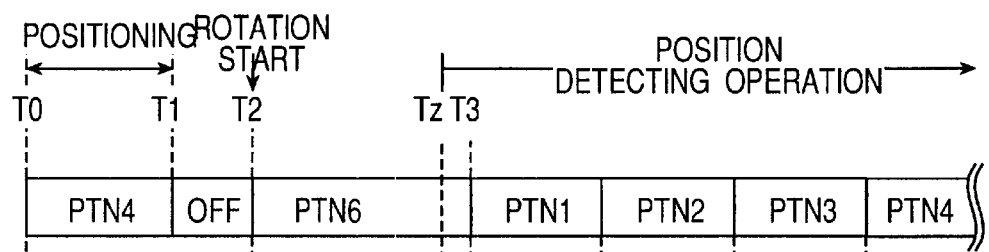
FIG. 6A is a chart showing the sequence of conduction patterns at a start-up.
Figure 6B:
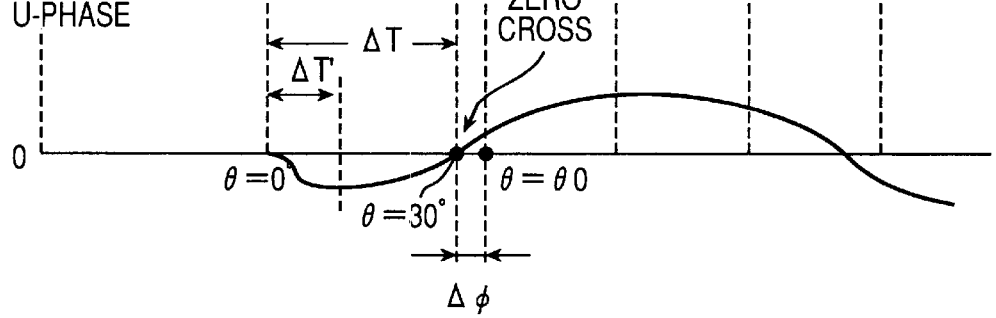
FIG. 6B is a chart showing an induced voltage of the stator winding on U-phase at a start-up.

FIG. 6A is a chart explaining an example of the pattern change of the drive signal in start-up control. FIG. 6B is also a chart showing the variation in the U-phase induced voltage of the stator winding 12b of the brushless DC motor 12 in conjunction with FIG. 6A. In addition, in FIGS. 6A and 6B, the drive signal pattern (namely, conduction phase) is changed over not at a zero-cross point of the induced voltage of the stator winding 12b, but at a timing delayed from the zero-cross point by a predetermined time (a timing delayed by Δφ in phase).

In FIG. 6A, the rotor 12a is positioned with the pattern PTN4 during a period from time $T_0$ to $T_1$, and the conduction is turned off once for a period from time $T_1$ to $T_2$. The rotor 12a is started to rotate at the time $T_2$ with the pattern PTN6. At that time, the controller 19 does not detect the induced voltage for the specified time ΔT from the start of rotation of the rotor 12a with the pattern PTN6 so as to prevent any misdetection. That is, the controller 19 does not detect the induced voltage from the start of rotation until the rotor 12a reaches a rotation angle of 30°. Also, in FIGS. 6A and 6B, a zero-cross of the induced voltage is detected at a time point when the specified time ΔT has just elapsed, and therefore the pattern is changed over at a time point (time $T_3$) delayed from this zero-cross point by Δφ. The position detecting operation is carried out from the time $T_z$ onward.

The specified time ΔT may also be set to time ΔT' shorter than the time ΔT as shown in FIGS. 6A and 6B, as long as the time allows a stable induced voltage of the stator winding 12b to be obtained. While the conduction with the pattern PTN6 is kept, it is necessary to drive the brushless DC motor 12 at a large start-up duty ratio in order to accelerate the brushless DC motor 12 up to such a frequency that enough induced voltage of the stator winding 12b can be obtained in the following position detecting operation.

As described above, in this embodiment, the positioning of the rotor 12a is done before the start-up of the brushless DC motor 12, and after the positioning, the rotor 12a is started to rotate. At this time point, since the position of the rotor 12a has been established, a specified conduction phase for generating magnetic fields to obtain a maximum torque is determined. With electrical conduction to this conduction phase, the brushless DC motor 12 can be accelerated in a short time up to a high enough frequency to generate the induced voltage for rotor position detection. This makes it possible to switch to the position detecting operation soon after the start-up of rotation of the rotor 12a, so that the brushless DC motor 12 can be started up without the need for performing the synchronized operation that requires an overexcitation operation. Thus, the motor current at a start-up can be reduced while motor vibrations can be suppressed.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An apparatus for use with a DC power supply and for use in driving a motor having a three-phase stator winding and a rotor, said apparatus comprising:
   a DC/AC converter having switching devices and being operable to convert an output from the DC power supply into an alternating current by a switching operation of the switching devices and operable to output the alternating current to the motor;
   a position detector operable to detect a position of the rotor of the motor after a specified time elapses after a start of rotation of the rotor;
   a controller operable to control the switching operation of said DC/AC converter to change conduction phases of the three-phase stator winding of the motor, wherein said controller is operable to supply electric current to a first conduction phase of the three-phase stator winding to position the rotor at a specified position, turn off the electric current to the first conduction phase of the three-phase stator winding, supply current to a second conduction phase of the three-phase stator winding, and change conduction phases of the three-phase stator winding based on the position of the rotor detected by said position detector after the specified time elapses after the start of rotation of the rotor.

2. An apparatus claimed in claim 1, wherein the specified time is a time period necessary for the rotor to rotate a predetermined angle from a start position.

3. An apparatus claimed in claim 2, wherein the predetermined angle is 30°.

4. An apparatus claimed in claim 1, wherein said controller is operable to supply electric current to two conduction phases of the three-phase stator winding to position the rotor at the specified position.

5. A method for driving a motor having a rotor and a three-phase stator winding, said method comprising:
   before start-up of the motor, positioning the rotor to a specified position by supplying an electric current to a first conduction phase of the three-phase stator winding;
   turning off the electric current to the first conduction phase of the three-phase stator winding;
   rotating the rotor by supplying an electric current to a second conduction phase of the three-phase stator winding; and
   after a specified time elapses since the rotor starts rotating, detecting a position of the rotor and changing conduction phases based on the detected rotor position.

6. A method claimed in claim 5, wherein the specified time is a time period necessary for the rotor to rotate a predetermined angle from a start position.

7. A method claimed in claim 6, wherein the predetermined angle is 30°.

8. A method claimed in claim 5, wherein said positioning the rotor to a specified position further comprises positioning the rotor to a specified position by supplying current to two conduction phases of the three-phase stator winding.

* * * * *